United States Patent Office 3,454,299
Patented July 8, 1969

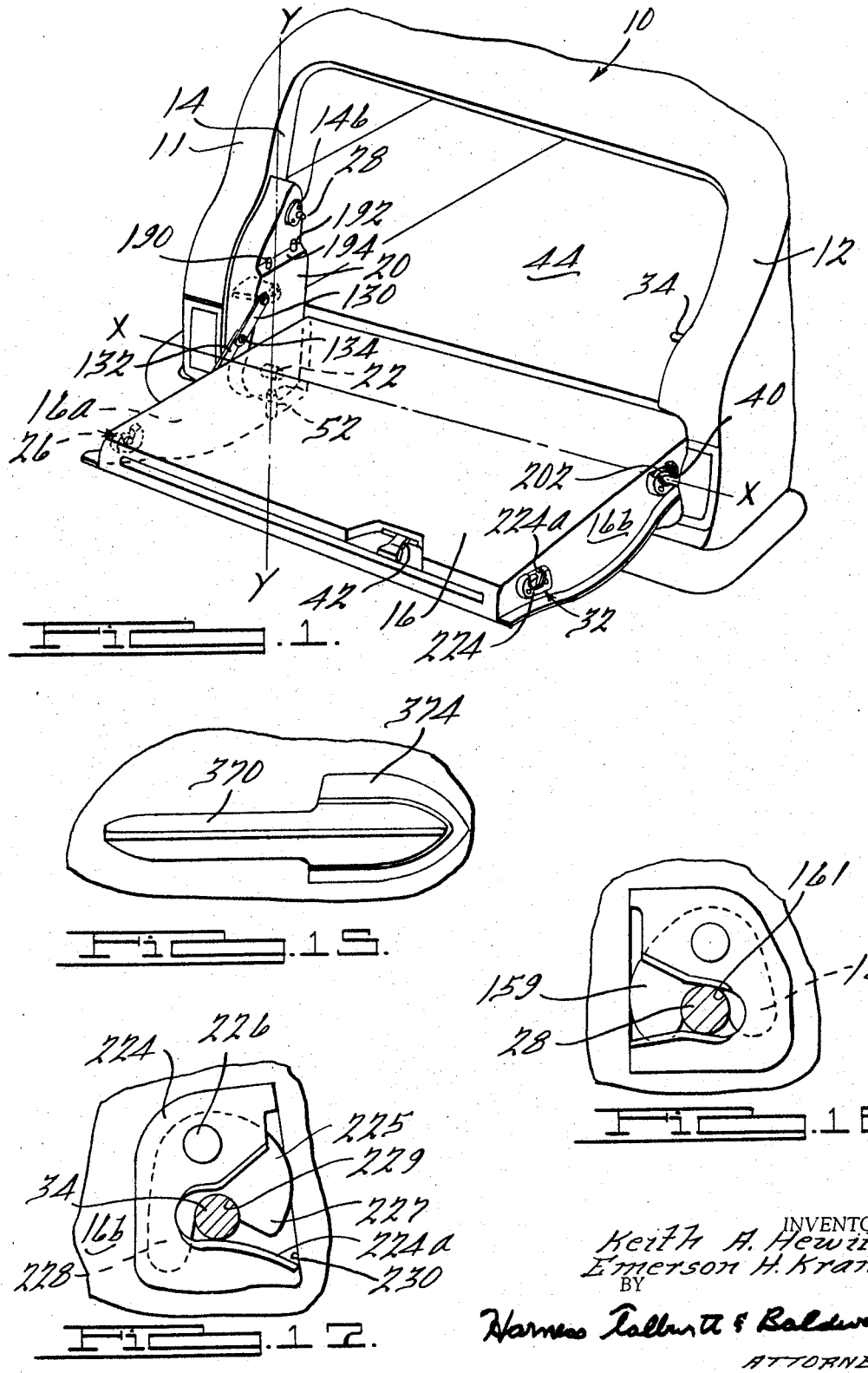

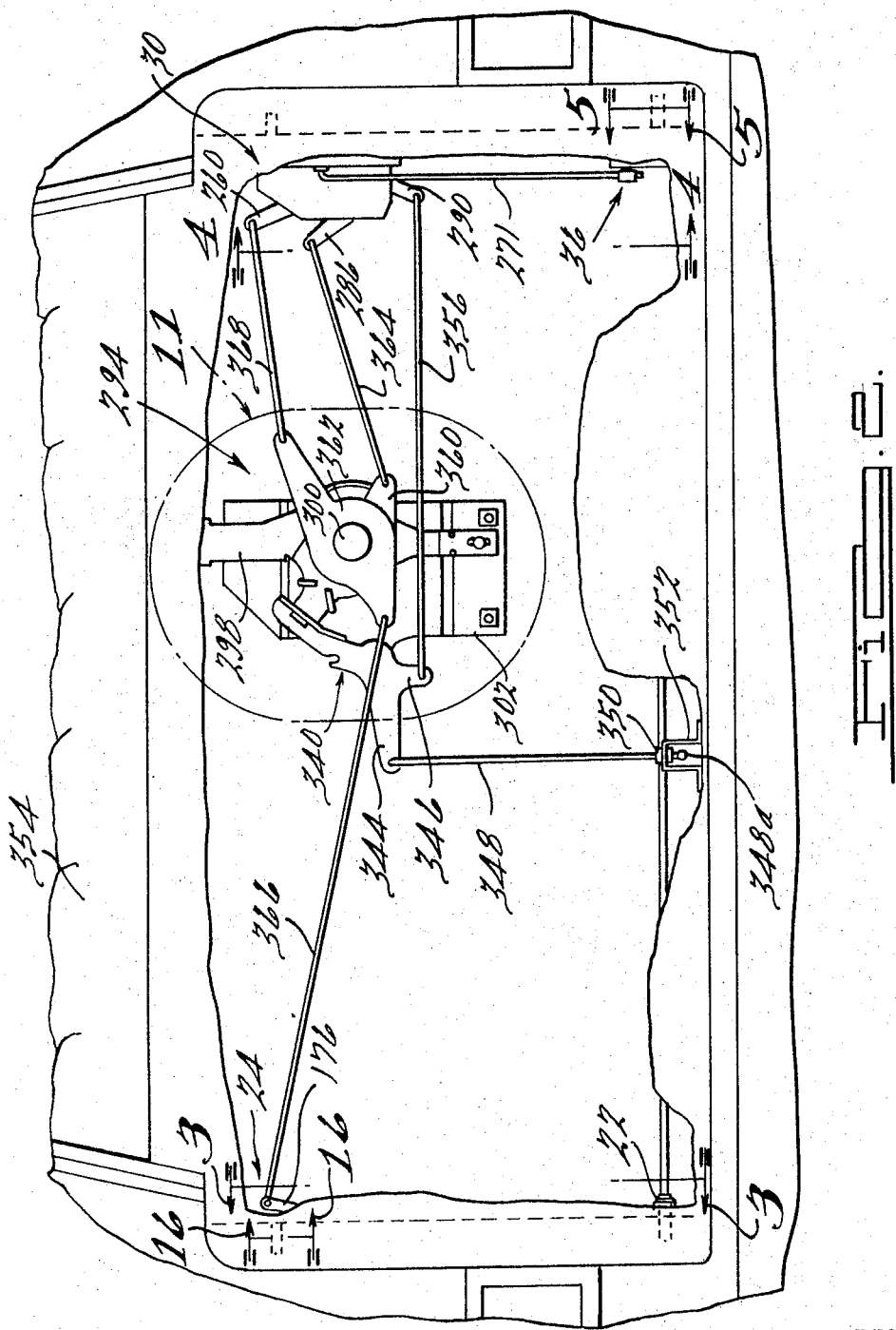

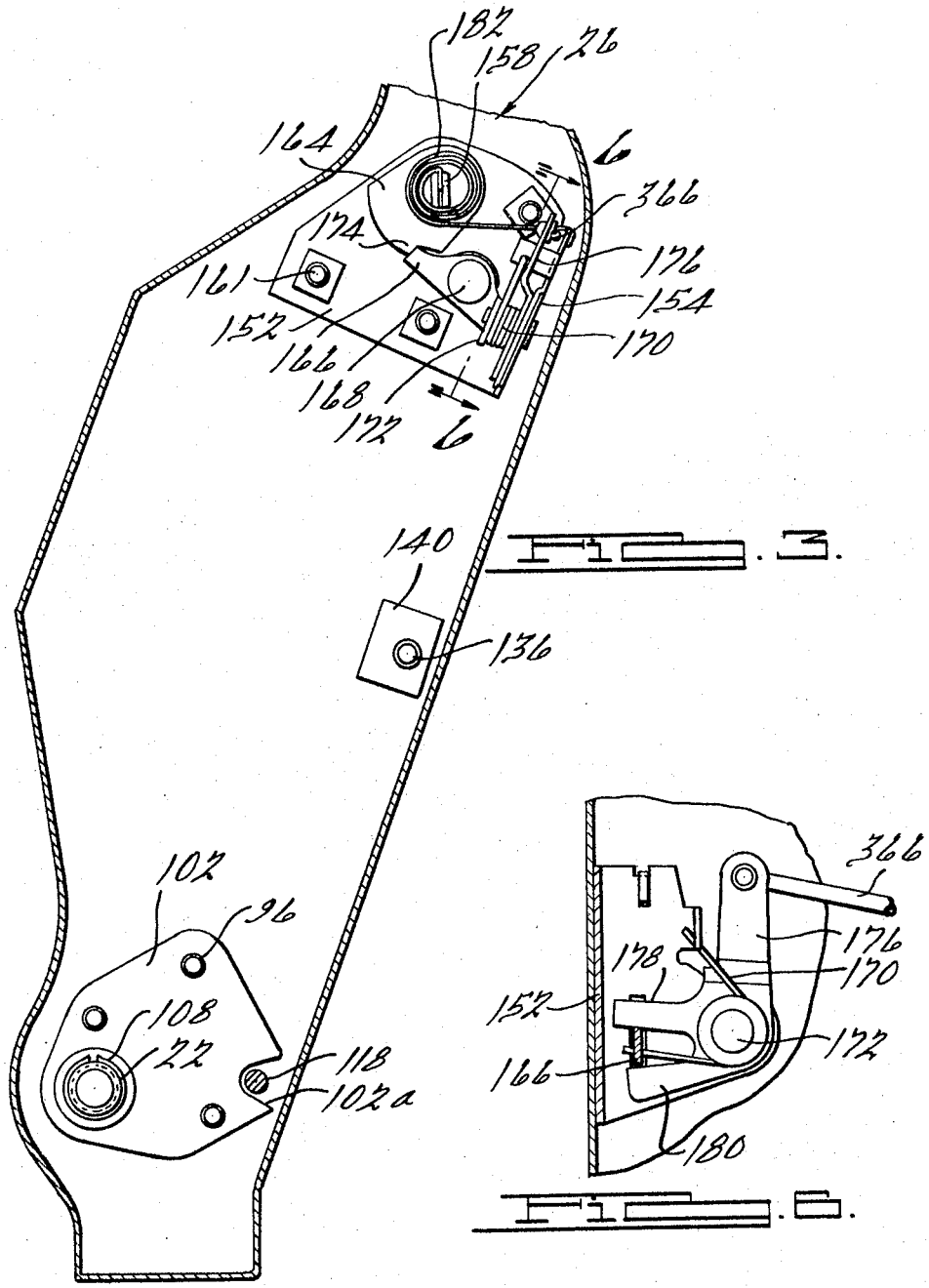

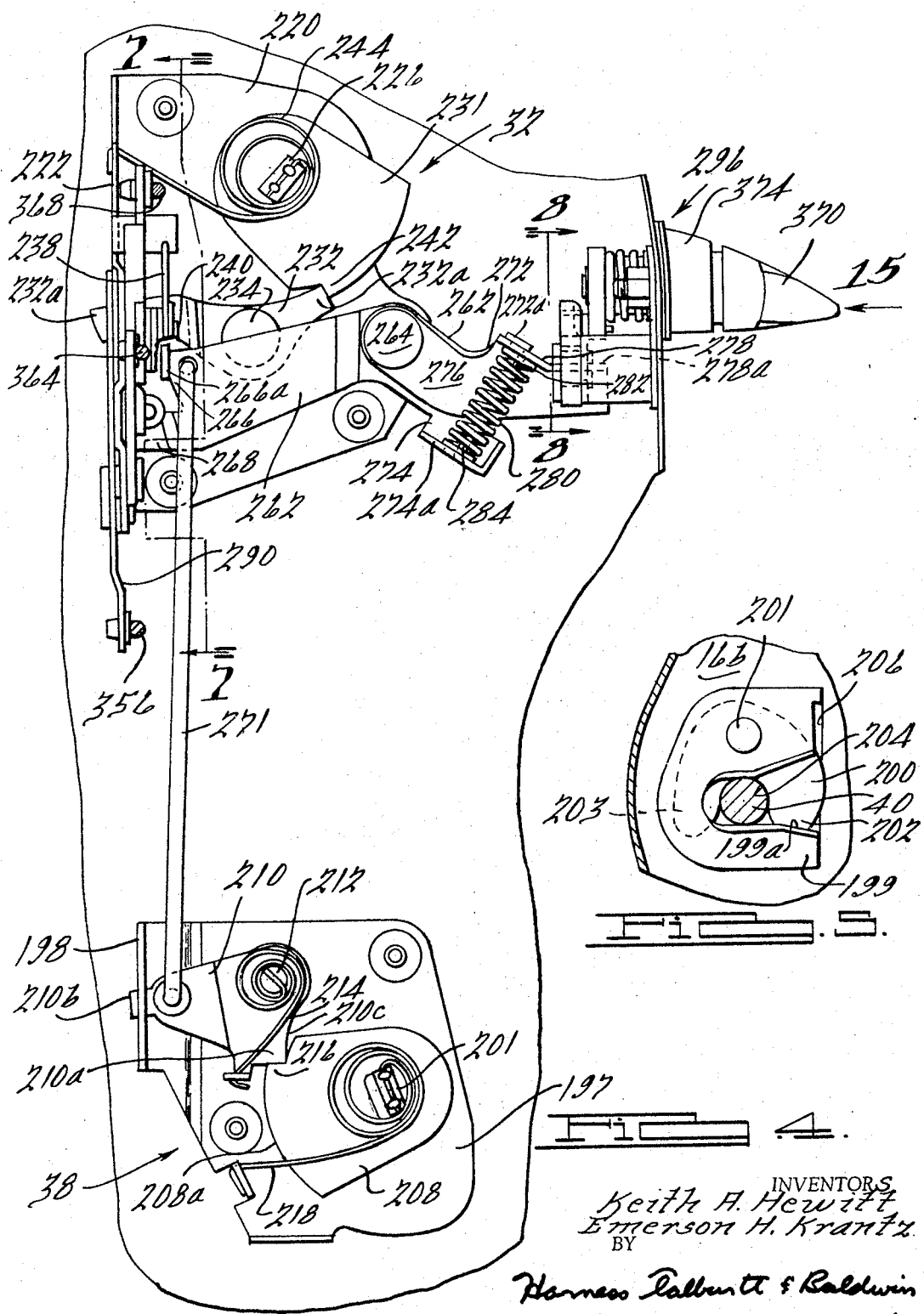

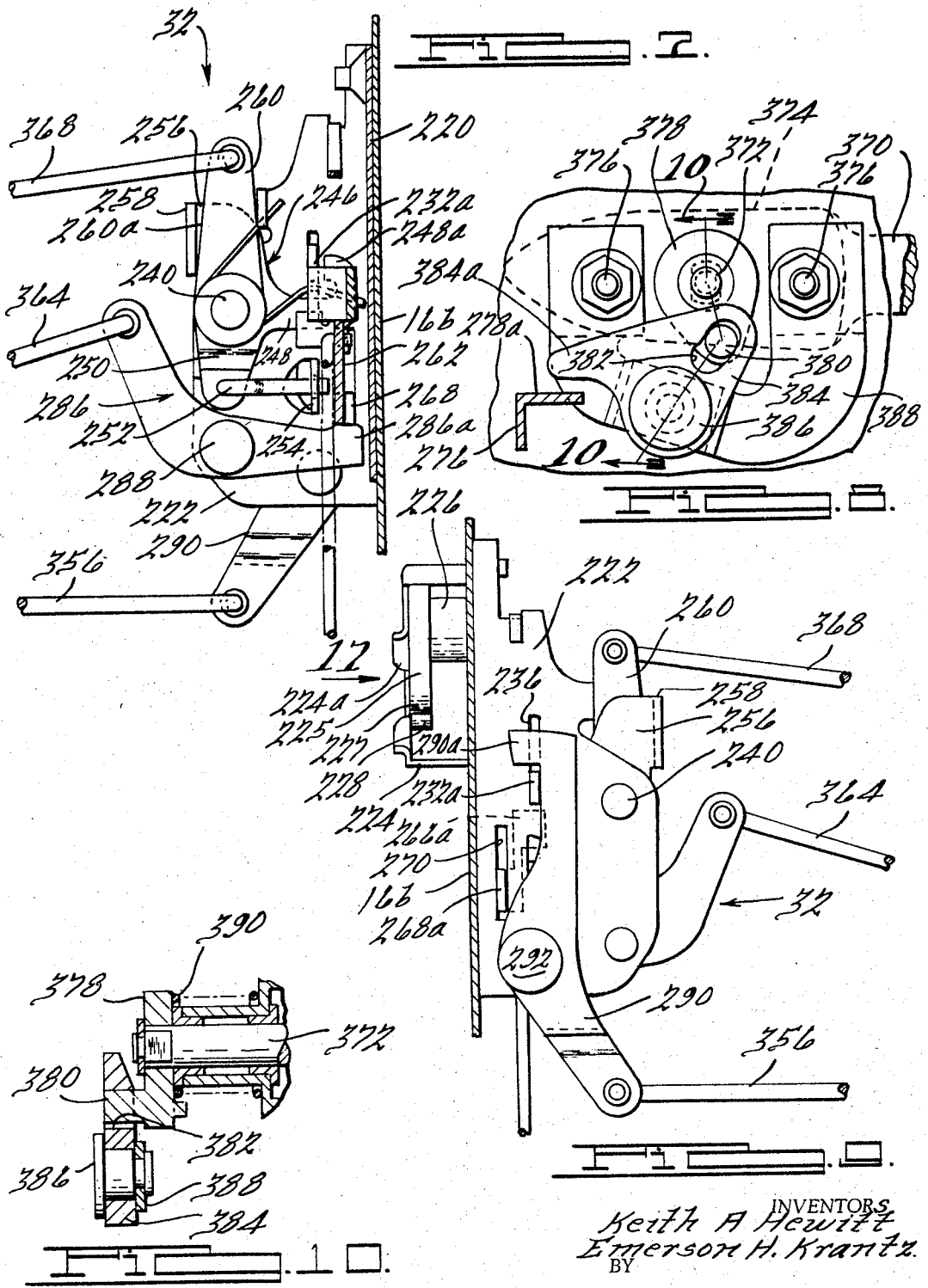

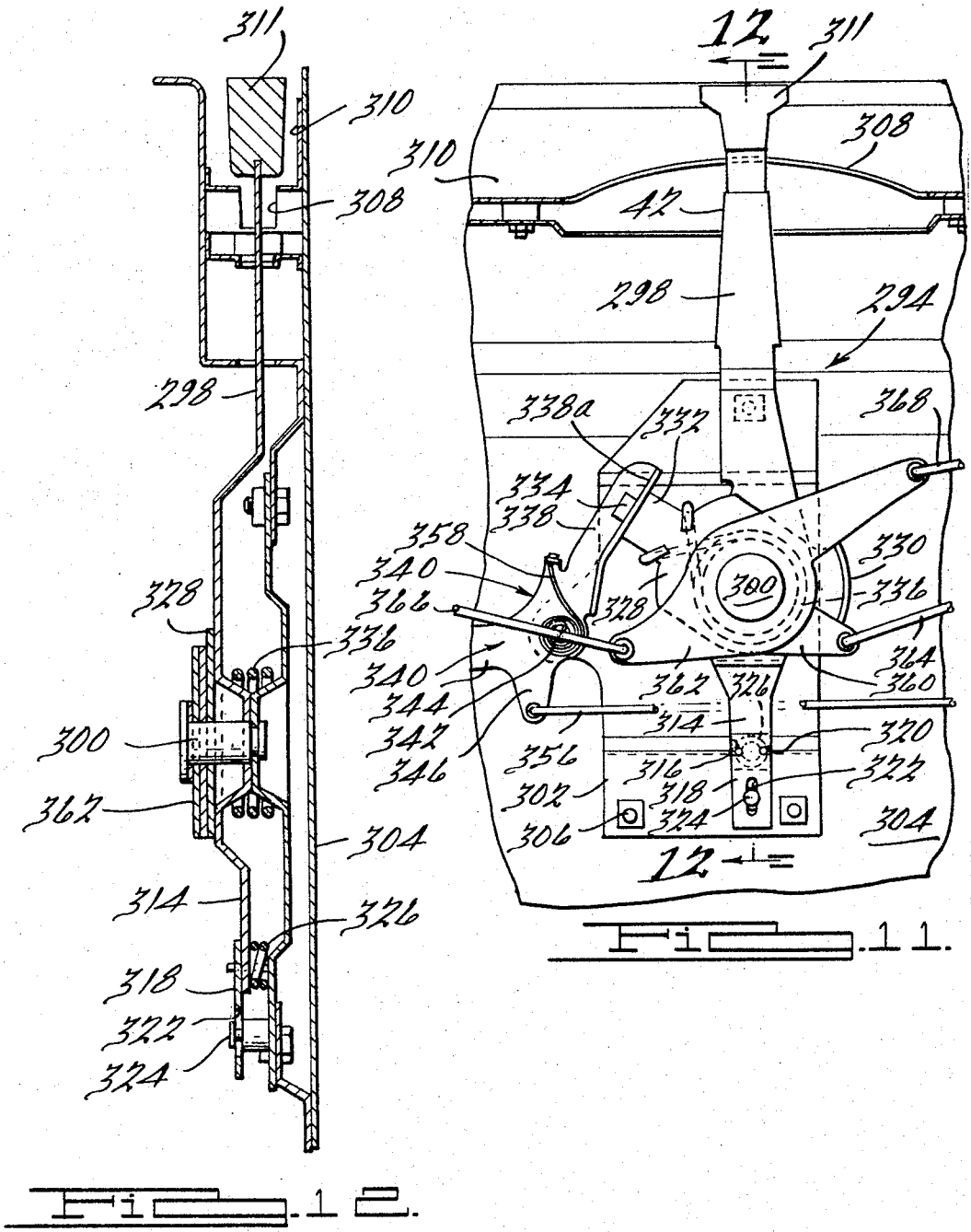

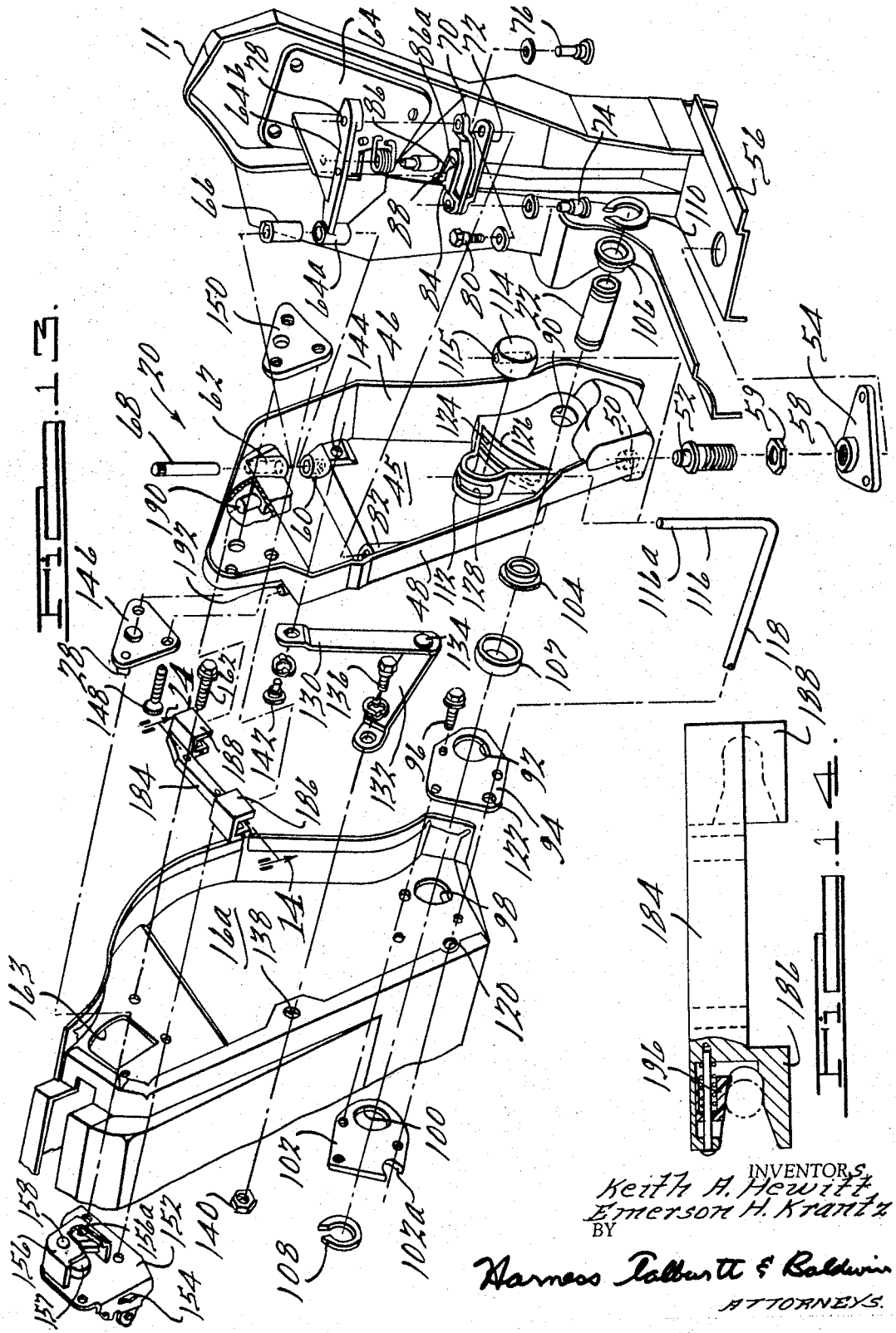

3,454,299
DOUBLE-HINGED TAILGATE
Keith A. Hewitt, Highland, and Emerson H. Krantz, Roseville, Mich., assignors to Chrysler Corporation, Highland, Mich., a corporation of Delaware
Filed Oct. 25, 1966, Ser. No. 589,301
Int. Cl. B62d *33/02, 27/00, 25/00*
U.S. Cl. 296—50
12 Claims

ABSTRACT OF THE DISCLOSURE

A two-way tailgate for an automobile of the station wagon type. The tailgate includes a pillar member which extends generally vertically along one side edge of the tailgate opening and is mounted for rotation about an axis generally parallel to that door opening edge; the gate itself is mounted on the pillar member for swinging movement on the pillar member about an axis generally normal to the pillar member axis. The gate may thus be swung selectively either with the pillar member about the pillar member axis or on the pillar member about the axis normal to the pillar member axis.

---

This invention relates to a door assembly for a motor vehicle wherein the door is mounted for selective pivotal movement about a plurality of axes. More particularly, it relates to a tailgate assembly for a motor vehicle of the suburban or station wagon type in which the tailgate is double-hinged to allow it to be selectively pivoted about either a generally horizontal axis or a generally vertical axis.

It is an object of the present invention to provide an improved door assembly of the multiple hinge-axis type.

A more specific object is to provide an improved tailgate assembly of the double-hinged type.

A yet more specific object is to provide a double-hinged tailgate assembly which is simpler than known constructions.

Another object is to provide a double-hinged tailgate assembly which is less expensive to fabricate and manufacture than known constructions.

Another object is to provide a double-hinged tailgate assembly which is more reliable and safer in operation than known constructions.

Still another object is to provide a double-hinged tailgate assembly which is easier and more convenient to operate than known constructions.

Yet another object is to provide a double-hinged tailgate assembly which presents a smoother exterior appearance than known constructions.

The door assembly of the invention includes an elongated pillar member which extends along one side edge of the door opening defined by the vehicle body structure and is mounted for rotation about an axis generally parallel to that door opening edge, and the door member itself is mounted on the pillar member for swinging movement on the pillar member about an axis generally normal to the pillar member axis. The door member may thus be swung selectively either with the pillar member about the pillar member axis or on the pillar member about the axis normal to the pillar member axis.

According to a further feature of the invention, means are provided to connect the door to the pillar at two points spaced on the pillar along the pillar axis and two points spaced on the door along the aforesaid one side edge of the latter; the means connecting one of the points on the pillar to the corresponding point on the door comprise means mounting the door as aforedescribed for swinging movement on the pillar about an axis generally normal to the pillar axis; the means connecting the other point on the pillar to the other point on the door comprise latch means for releasably latching the door to the pillar when the door is swung on the pillar about its aforesaid normal axis to a position generally in alignment with the pillar. Thus, with the door latched to the pillar, the door may be swung with the pillar about the pillar axis and with the latch means in an unlatched condition, the door may be swung downwardly about its normal axis independently of the pillar.

According to a further feature of the invention, further latch means are provided which are operative in response to swinging movement of the door and pillar assembly about the pillar axis to its closed position to latch the door assembly in that position.

According to yet another feature of the invention, latch release means are provided which are operative to selectively release the latch means holding the door to the pillar, whereby to allow the door to swing downwardly about its normal axis independently of the pillar, or to release the latch means holding the door assembly to the body structure, whereby to allow the door to swing with the pillar about the pillar axis.

According to yet another feature of the invention, the latch release means includes a handle member movably mounted on the door and means operative in response to movement of the handle in one direction to release the door for movement with the pillar about the pillar axis and in response to movement of the handle in another direction to release the door for movement about its normal axis independently of the pillar.

These and other objects, features and advantages of the invention will be apparent from the following detailed description of a preferred embodiment of the invention and from the accompanying drawings wherein:

FIG. 1 is a fragmentary perspective view of a motor vehicle of the suburban or station wagon type embodying a double-hinged tailgate assembly according to the invention;

FIG. 2 is a fragmentary rear view of the motor vehicle of FIG. 1 showing the tailgate in a closed position;

FIGS. 3, 4 and 5 are cross sectional views taken on lines 3—3, 4—4, and 5—5, respectively, of FIG. 2;

FIG. 6 is a cross sectional view taken on line 6—6 of FIG. 3;

FIGS. 7 and 8 are cross sectional views taken on lines 7—7 and 8—8, respectively, of FIG. 4;

FIG. 9 is a view taken from the rear of FIG. 7;

FIG. 10 is a cross sectional view taken on line 10—10 of FIG. 8;

FIG. 11 is a view on an enlarged scale of the structure within circle 11 of FIG. 2;

FIG. 12 is a cross sectional view taken on line 12—12 of FIG. 11;

FIG. 13 is an exploded fragmentary view showing details of the pillar member and adjacent structure;

FIG. 14 is a cross sectional detail view taken on line 14—14 of FIG. 13;

FIG. 15 is a fragmentary detail view looking in the direction of the arrow 15 in FIG. 4;

FIG. 16 is a cross sectional view taken on line 16—16 of FIG. 2; and

FIG. 17 is a fragmentary detail view looking in the direction of the arrow 17 in FIG. 9.

General description

The motor vehicle seen fragmentarily in FIG. 1 includes a body structure 10 including left and right body pillars 11, 12 defining therebetween a generally rectangular door or tailgate opening 14, and a door or tailgate assembly including a tailgate 16 adapted to close the lower portion of opening 14.

The tailgate assembly, in addition to tailgate 16, includes an elongated pillar member 20 disposed adjacent the lower portion of the inner face of left body pillar 11 and mounted for rotation about a generally vertical axis Y—Y. Tailgate 16 is mounted on pillar 20 for swinging movement on pillar 20 about a generally horizontal axis X—X. It will thus be seen that gate 16 may either be swung outwardly with pillar 20 about vertical axis Y—Y or swung downwardly independently of pillar 20 about horizontal axis X—X.

Referring now particularly to FIGS. 1 and 2, the latching and hinging structure for the tailgate, broadly considered, includes a pivot pin 22 projecting inwardly from the lower end of pillar 20 and journaled in the adjacent side wall 16a of tailgate 16; an upper left latching assembly 24 including a rotary latch mechanism 26 on the upper or outer end of left side wall 16a for coaction with a latch pin or striker 28 projecting inwardly from the upper end of pillar 20; an upper right latching assembly 30 including a rotary latch mechanism 32 on the upper or outer end of right side wall 16b of tailgate 16 for coaction with a latch pin or striker 34 projecting inwardly from the inner face of right body pillar 12 generally at the height of striker 28; and a lower right latching assembly 36 including a rotary latch mechanism 38 on the lower end of right side wall 16b for coaction with a pivot pin or striker 40 projecting inwardly from the lower end of the inner face of right body pillar 12. A latch release assembly, including a handle member 42, selectively controls the release of the various latching assemblies.

When the upper left and upper right latching assemblies are released while maintaining the lower right assembly in a latched condition, tailgate 16 may be swung downwardly about axis X—X to its illustrated open position in which it forms an extension of the cargo floor 44 of the motor vehicle. During this downward movement, the gate moves independently of pillar 20 and is journaled by pivot pin 22 and by pivot pin 40 forming the striker of the lower right latch assembly. When the upper right and lower right latch assemblies are released while maintaining the upper left latch assembly in a latched condition, gate 16 may be swung with pillar 18 outwardly as a door about vertical axis Y—Y.

*Detailed description*

As best seen in FIGS. 1 and 13, pillar 20 is formed as a hollow one-piece casting and includes an inner wall 45, a forward flange 46 and a rearward flange 48. A socket 50 formed in the lower end of pillar 20 receives a pivot pin 52 projecting rigidly upwardly from a mounting plate 54 carried by the rear sill 56 of body structure 10. Plate 54 includes a threaded bore 58 receiving the threaded lower end of pin 52 to allow vertical adjustment of that pin. A locking nut 59 locks pin 52 in any position of vertical adjustment.

A pair of vertically spaced bosses 60, 62 formed in the hollow of casting 20 at the juncture of wall 45 and forward flange 46 receive the cylindrical outer end 64a of a bracket 64 secured to the inner face of left body pillar 11. The vertically aligned bores of bosses 60, 62 and bracket outer end 64a receive a sleeve 66 and pivot pin 68. The axes of pivot pins 52 and 68 are aligned to define the vertical hinge axis Y—Y about which gate 16 and pillar 20 pivot together to provide operation of the gate as a door.

The opening movement of gate 16 when pivoted about axis Y—Y is limited by a pair of links 70, 72 pivotally interconnected at their one ends by a pin 74. The other end of link 70 pivots on a pin 76 received in a bore 78 provided in a rib portion 64b of bracket 64, and the other end of link 72 pivots on a pin 80 threaded into a boss 82 formed in the hollow of casting 20 at the juncture of wall 45 and rearward flange 48. A third link 84 pivots at one end on pin 74 and includes a guide slot 86 at its other end receiving a guide pin 88 projecting downwardly from rib portion 64b of bracket 64. Link 84 functions to preclude movement of links 70, 72 into a dead center position during pivotal movement of the pillar and gate about axis Y—Y, whereby to prevent binding of links 70, 72. Guide slot 86 includes an offset end portion 86a into which guide pin 88 moves as the gate reaches its fully open position, whereby link 84 further functions as a check to hold the gate in its open position.

Casting 20 further includes a bore 90 passing pivot pin 22; pin 22 also passes through a bore 92 provided in a reinforcing plate 94 secured by bolts 96 to the outer face of tailgate wall 16a, through a bore 98 in tailgate wall 16a, and through a bore 100 provided in a reinforcing plate 102 secured by bolts 96 to the inner face of tailgate wall 16a. Bushings 104 and 106 and spacer 107 rotatably embrace pin 22 in the assembled relation of the pillar and gate and snap rings 108 and 110 engage grooves provided adjacent the opposite ends of pin 22 to preclude disassembly of the various elements.

Casting 20 further includes a spherical socket portion 112 formed in the hollow of the casting intermediate the upper and lower ends of the casting. Socket 112 rotatably receives a plastic biscuit member or disk 114 having a diametrical bore 115 therethrough slidably receiving the free end 116a of the crank arm 116 of a torsion bar 118. The main body portion of torsion bar 118 is secured at its distal end (not shown) to tailgate 16 adjacent tailgate end wall 16b and extends transversely within the hollow of the tailgate, through a cut-out or bite 102a in reinforcing plate 102, through a bore 120 in tailgate side wall 16a, and through a bore 122 in reinforcing plate 94 whereafter it bends upwardly to form crank arm 116. Crank arm 116 passes upwardly through a slot 124 formed in a step 126 in casting 20, then through diametrical bore 115 in bisquit 114 and then through an arcuate slot 128 in socket portion 112. During pivotal movement of gate 16 about the axis of pivot pin 22, slots 24 and 128 allow crank arm 116 to swing with the bisquit 114 about the axis of the bisquit while bore 115 allows crank arm 116 to slide vertically relative to the bisquit. It will be understood that torsion bar 118 alternately twists and unwinds during pivotal movement of gate 16 about the axis of pin 22 to alternately store and release energy for counterbalancing purposes.

The downward pivotal movement of gate 16 about the axis of pin 22 is limited by a pair of links 130, 132 pivotally interconnected at their one ends by a pin 134. The other end of link 132 is pivotally secured to gate 16 by a bolt 136 passing through a bore 138 in tailgate side wall 16a for threaded engagement with a weld nut 140. The other end of link 130 is pivotally secured to pillar 20 by a pin 142 passing through a bore 144 in pillar wall 45.

The upper left latch assembly 24, as previously indicated, includes a striker pin 28 on pillar 20 and a latch mechanism 26 carried on the upper portion of tailgate side wall 16a. As best seen in FIG. 13, striker pin 28 is carried by a reinforcing plate 146 secured to the outer face of pillar wall 45 by bolts 148 passing through plate 146 and pillar wall 45 for engagement with a reinforcing plate 150 positioned against the inner face of pillar wall 45.

Latch mechanism 26 includes a mounting plate 152 having a flange portion 154, a housing 156 welded to one face of mounting plate 152 and having an open-mouthed slot 156a for receipt of striker 28, and a rotary latch 157 journaled in housing 156 by a pin or shaft 158 and having a latch arm 159 (FIG. 16) and a throw-out arm 160 defining therebetween a slot or throw-out 161. In assembled relation, mounting plate 152 is held against the inner face of tailgate side wall 16a by bolts 162 with housing 156 projecting through an opening 163 in side wall 16a to position rotary latch 157 in the longitudinal plane of striker 28 so that it may coact with that striker upon rotation of the gate about the axis of pin 22 to its closed position to latch the gate in that position. Specifically, as the gate approaches its closed position, striker 28 enters slot 156a in housing 156 and engages throw-out arm 160 of rotary latch 157; this rotates latch 157 from its open or unlatched position of FIG. 13 to its latched position of FIG. 16 in which latch arm 159 is wrapped around striker 28 to trap the striker within throat 161.

Referring now to FIGS. 3 and 6, and with continued reference to FIG. 13, latch mechanism 26 further includes a ratchet 164 secured to the end of shaft 158 in a position on the opposite side of mounting plate 152 from rotary latch 157. A detent 166 is pivotally mounted intermediate its ends on plate 152 by a pivot pin 168. A coil spring 170 wound around a pin 172 carried by flange portion 154 engages one end of detent 166 to continuously urge it in a clockwise direction as viewed in FIG. 3. The other end of detent 166 coacts in known manner with a tooth 174 on ratchet 164 to maintain latch mechanism 26 in a latched condition upon rotation of rotary latch 157 by striker pin 28 upon closing movement of the gate. Latch mechanism 26 further includes a detent release lever 176 pivotally mounted intermediate its ends on pin 172. One end of detent release lever 176 is bifurcated to provide a pair of arms 178 and 180 embracing the free end of detent lever 166. Pivotal movement of detent release lever 176 in a clockwise direction as viewed in FIG. 5 rotates detent lever 166 out of engagement with tooth 174 and allows latch return spring 182 to return ratchet 164 and rotary latch 157 to their unlatched positions.

Latch mechanism 26 further includes a "dog bone" 184 (FIG. 13) secured by bolts 162 to the outer face of tailgate side wall 16a in a position below housing 156. "Dog bone" 184 defines longitudinally spaced sockets 186 and 188 which, upon movement of the tailgate about the axis of hinge pin 22 to its closed position, respectively receive wedge pins 190 and 192 upstanding from a shoulder 194 (FIG. 1) provided on pillar casting 20. As best seen in FIG. 14, each socket 186, 188 houses a spring biased wedge block 196 which coacts with the related wedge pin upon closing of the gate to wedge that pin securely within the related socket and provide a rigid connection between gate 16 and pillar 20. The upper tip of rearward wedge pin 190 is disposed below the upper tip of wedge pin 192 so as to allow leading socket 186 to pass above wedge pin 190 to receive wedge pin 192.

Lower right latch assembly 36, as previously indicated, includes a striker pin 40 projecting inwardly from the inner face of body pillar 12 and a latch mechanism 38 carried on the lower portion of tailgate side wall 16b. As best seen in FIGS. 1, 4 and 5, latch mechanism 38 includes a mounting plate 197 having a flange portion 198, a housing 199 welded to one face of mounting plate 197, and having an open-mouthed slot 199a for receipt of striker 40, and a rotary latch 200 journaled in housing 199 by a shaft 201 and having a latch arm 202 and a throw-out arm 203 defining therebetween a slot or throat 204. Mounting plate 197 is positioned against the inner face of tailgate side wall portion 16b to pass housing 199 through an opening 206 in that side wall and position rotary latch 200 in the longitudinal plane of striker pin 40 so that it may coact with that striker upon rotation of the gate about the pillar axis Y—Y to its closed position to latch the gate in that position. Specifically, as the gate approaches its closed position, striker 40 enters slot 199a in housing 199 and engages throw-out arm 203 of rotary latch 200; this rotates latch 200 from an unlatched position to its latched position of FIG. 5 in which latch arm 202 is wrapped around striker 40 to trap the striker within throat 204.

As best seen in FIG. 4, latch mechanism 38 further includes a ratchet 208 secured to shaft 201 and positioned on the side of mounting plate 197 opposite rotary latch 200. A detent lever 210 is pivoted on mounting plate 197 by a pin 212 and is continuously spring biased in a counterclockwise direction as viewed in FIG. 4 by a coil spring 214 wound around pin 212. Detent lever 210 coacts at one end 210a with a tooth 216 formed on ratchet 208 to maintain ratchet 208 and rotary latch 200 in their latched condition. The other end 210b of detent lever 210 guides in a slot (not seen) provided in mounting plate flange portion 198. A coil spring 218 acts to return ratchet 208 and rotary latch 200 to their unlatched positions upon disengagement of detent lever 210 from tooth portion 216.

Upper right latch assembly 30, as previously indicated, includes a striker pin 34 projecting inwardly from the inner face of body pillar 12 and a latch mechanism 32 carried on the upper portion of tailgate side wall 16b. Latch mechanism 32, as best seen in FIGS. 1, 2, 4, 7, 9, and 17 includes a mounting plate 220 having a flange portion 222, a housing 224 welded to the outer face of mounting plate 220 and having an open-mouthed slot 224a for receipt of striker pin 34, and a rotary latch 225 journaled in housing 224 by a shaft 226 and having a latch arm 227 and a throw-out arm 228 defining therebetween a slot or throat 229. Mounting plate 220 is positioned against the inner face of tailgate side wall 16b with housing 224 projecting through an opening 230 in that side wall to position rotary latch 226 in the longitudinal plane of striker 34 so that it may coact with that striker upon rotation of the gate, about either axis X—X or Y—Y, to its closed position to latch the gate in that position. Specifically, as the gate approaches its closed position, striker 34 enters slot 224a in housing 224 and engages throw-out arm 228 of rotary latch 225; this rotates latch 225 from an unlatched position to its latched position of FIG. 17 in which latch arm 227 is wrapped around striker 34 to trap the striker within throat 224a. Since slot 229a must receive striker 34 when the gate is rotated about the horizontal hinge axis as well as when the gate is rotated about the vertical hinge axis, slot 224a is provided with a wider, more flaring mouth than the corresponding slots in the latch housings of latch assemblies 24 and 36.

A ratchet 231 is secured to the inner end of shaft 226 and is positioned adjacent the inner face of mounting plate 220. A detent lever 232 is pivotally mounted intermediate its ends to mounting plate 220 by a pin 234. One end 232a of detent release lever 232 projects through a slot 236 in mounting plate flange portion 222. A coil spring 238 wound around a pin 240 carried by flange portion 222 engages detent release lever 232 adjacent end 232a to continuously bias lever 232 in a counterclockwise direction as viewed in FIG. 4. The other end 232b of the detent release lever coacts with a tooth 242 formed on ratchet 230 to maintain ratchet 230 and rotary latch 226 in their latched condition upon engagement of latch 226 with striker 34. A coil spring 244 acts to return ratchet 230 and rotary latch 225 to their unlatched positions upon disengagement of detent lever 232 from ratchet tooth 242.

Latch mechanism 32 further includes a detent release lever 246 pivotally mounted on flange portion 222 by a pin 240. Lever 246 includes an arm portion 248 having a hook formation passing below end 232a of detent lever 232 and then bending up to a tip end 248a which overlies detent lever end 232a in the unlatched condition of the latch mechanism. Detent release lever 246 further includes a downwardly extending arm portion 250 having an aperture at its lower end receiving one end of a rod 252. The other end of rod 252 passes slidably through an aperture in a lug 254 struck from mounting plate flange portion 222. Release lever 246 further includes an upstanding arm portion 256 having an upturned side flange 258. A driver lever 260, pivoted at its lower end on pin 240, is arranged to abut at its edge 260a against flange 258 to provide a one-way drive between driver lever 260 and detent release lever 246.

Latch mechanism 32 further includes a second detent release lever 262 pivoted intermediate its ends on a pin 264 carried by mounting plate 220. The left end of lever 262 (as viewed in FIG. 4) is bifurcated to provide upper and lower arms 266 and 268. The free end of upper arm 266 is bent inwardly to form a tab portion 266a directly underlying lever 232 adjacent end 232a. A control rod 271 is journaled at its upper end in detent release lever 262 adjacent tab portion 266a; the lower end of rod 271 is journaled in the upper end 210b of detent lever 210 of latch assembly 38. The free end 268a of lower arm 268 is received within a vertical guide slot 270 in mounting plate flange portion 222. The right end of release lever 262 (as viewed in FIG. 4) includes an upper arm portion 272 bent over to form a tab 272a and a lower arm portion 274 bent over to form a flange 274a. A driver lever 276 is pivoted at one end to pin 264. Lever 276 includes a flange portion 278 presenting a cam surface 278a at its upper face. A coil spring 280 is compressed between flange 274a on detent release lever 262 and flange 278 on driver lever 276 to continuously urge flange 278 into abutment with tab 272a while yet allowing spring-resisted relative pivotal movement of levers 262 and 276. Spring 280 is held in place by tabs 282, 284 struck from flange 278 and flange 274a, respectively.

Latch mechanism 32 further includes an actuator lever 286 of bell crank form pivoted intermediate its ends on a pin 288 carried by mounting plate flange portion 222. The lower end 286a of lever 286 directly underlies the lower arm 268 of detent release lever 262. Latch mechanism 32 also includes a locking lever 290 (FIG. 9) pivoted intermediate its ends on a pin 292 carried by mounting plate flange portion 222. The upper end 290a of lever 290 is of hook form and normally overlies the tip end 232a of detent lever 232.

The various latching assemblies are selectively controlled by an inner release assembly 294 (FIGS. 2 and 11), including the handle member 42, and by an outer release assembly 296 (FIG. 4).

With reference now to FIGS. 2, 11 and 12, the handle member 42 of inner release assembly 294 constitutes the upper end of a lever 298 pivoted intermediate its ends on a pin 300 carried by a mounting plate 302 secured to the inner skin 304 of tailgate 16 by bolts 306. Handle portion 42 of lever 298 passes upwardly through a transverse slot 308 in a housing 310 embedded in the upper forward face of tailgate 16; handle 42 is capped by a knob 311 adapted to be grasped by an operator for selective actuation of inner release assembly 294.

The lower end 314 of lever 298 includes a pair of oppositely disposed slots 316 opening at the opposite side edges of lever lower end 314. The upper end of a link 318 overlies the lower tip of end 314 with oppositely disposed slots 320 in the upper portion of the link overlying slots 316. The lower end of link 318 has a vertical slot 322 slidably receiving a pin 324 carried on mounting plate 302. A coil spring 326 underlies the superimposed tips of lower lever end 314 and link 318; the ends of spring 326 are crossed over one another in known manner and received in the aligned slots 316, 320 to yieldably resist disalignment of lever 298 and link 318 and return them to their aligned positions when the disaligning force is removed.

A short driver lever 328 is journaled on pin 300 over lever 298. One end of lever 328 is upturned to provide an arcuate flange portion 330; the other end of lever 328 includes an ear portion 332 terminating in a necked down tip portion 334. A coil spring 336 is wound around pin 300 beneath lever 298; the opposite ends of spring 336 are crossed over one another in known manner and hooked over the opposite side edges of ear portion 332.

Tip portion 334 coacts with a slot (not seen) in the flange portion 338a of one arm 338 of a multi-arm lever 340 to normally preclude rotation of spring-coupled levers 298 and 328 about the axes of pin 300. Lever 340 is pivoted on a pin 342 carried by mounting plate 302 and includes, in addition to arm 338, a generally transversely extending arm 344 and downwardly extending stub arm 346.

The upper end of a control rod 348 is journaled in the free end of arm 344; the lower end of rod 348 is slidably guided in a bushing 350 carried by a bracket 352 rigid with the adjacent tailgate frame structure. The lower tip of rod 348 is cranked to provide a crank arm 348a positioned in the path of the tailgate window glass 354. One end of a control rod 356 is journaled in the lower end of stub arm 346; the other end of rod 356 is journaled in the lower end of blocking lever 290 of upper right latch assembly 30. A coil spring 358 wound around pin 342 continuously urges lever 340 in a clockwise direction as viewed in FIG. 11.

Release assembly 294 further includes a lever 360 overlying driver lever 328 and pivoted at one end on pin 300 and a lever 362 overlying lever 360 and pivoted intermediate its ends on pin 300. The free end of lever 360 journals one end of a control rod 364, the other end of which is journaled in the upper end of actuator lever 286 of upper right latch assembly 30. The left or lower end of lever 362 journals one end of a control rod 366, the other end of which is journaled in the upper end of detent release lever 176 of upper left latch assembly 24. The right or upper end of lever 362 journals one end of a control rod 368, the other end of which is journaled in the upper end of driver lever 260 of upper right latch assembly 30.

Outer release assembly 296, as best seen in FIGS. 4, 8, 10 and 15, includes an outer handle 370 having a shaft 372 journaled in a base 374 secured to the outer skin of tailgate 16 by bolts 376. A driver member 378 having an eccentric drive pin 380 is keyed to the free end of shaft 372. Pin 380 is slidably received in a slot 382 provided in a camming member 384 pivoted on a pin 386 carried by a bracket 388 positioned adjacent the inner surface of the outer tailgate skin by bolts 376. Camming member 384 has a camming end 384a adapted to coact with the cam surface 278a on driver lever 276. A coil spring 390 wound about the axis of shaft 372 continuously urges handle 370 and driver member 378 in a counterclockwise direction as viewed in FIG. 8 to automatically return handle 370 to its generally horizontally extending rest or stop position of FIG. 15.

*Operation*

Gate 16 will normally occupy a closed position in which all of the latch assemblies are in a latched condition and the window glass 354 is raised to close the upper portion of body opening 14. To condition the gate for actuation either as a door or as a tailgate, window glass 354 is first lowered by suitable hand-crank or power means (not shown). As the window glass approaches its down position, the lower edge of the glass picks up crank arm 348a of control rod 348 so that upon continued downward movement of the glass to its down position rod 348 is pulled downwardly to rotate multi-arm lever 340 in a counterclockwise direction (as viewed in FIGS. 2 and 11) about pivot pin 342. This rotation of lever 340 moves lever arm flange portion 338a out of engagement with tip portion 334 of driver lever 328 and pushes control rod 356 to the right to pivot blocking lever 290 of upper right latching assembly 30 in a clockwise direction (as viewed in FIG. 9) to move hook end 290a to a position clear of the upward path, as defined by slot 236, of tip end 232a of detent lever 232. Gate 16 may now be opened either as a gate or as a door by selective manipulation of inner release assembly 294; or it may be opened as a door by actuation of outer release assembly 296.

If handle 42 is pivoted counterclockwise as viewed in FIG. 11, driver lever 328 moves with it by virtue of coupling spring 336 and flange portion 330 of lever 328 picks up lever 362 to move it counterclockwise; counterclockwise movement of lever 362 pulls control rod 368 to the left and pulls control rod 366 to the right. Rightward movement of control rod 366 pivots detent release lever 176 in a clockwise direction as viewed in FIG. 6, whereby to move detent lever 166 out of engagement with tooth 174 on ratchet 164 and allow spring 182 to rotate ratchet 164 and rotary latch 158 in an unlatching direction; this rotation of latch 158 causes throw-out arm 160 to eject striker 28 and kick the tailgate away from its closed position. Leftward movement of control rod 368 pivots driver lever 260, and thereby detent release lever 246, in a counterclockwise direction (as viewed in FIG. 7), whereby arm 248 picks up detent lever 232 and moves end 232b out of engagement with tooth 242 on ratchet 230. This allows spring 244 to rotate ratchet 231 and rotary latch 225 in an unlatching direction, whereupon throw-out arm 228 ejects striker 34 and kicks the tailgate 16 away from its closed position. The tailgate is now ajar and free to be pivoted downwardly as a gate about axis X—X to its open position of FIG. 1. During this movement, rotary latch 200 of lower right latch assembly 38 journals on the entrapped striker pin 40 so that the pivotal axis is defined by the horizontally aligned axes of pin 22 and striker 40. The lowered position of the gate is determined by the extension of check links 130, 132. When handle 42 is released following its counterclockwise movement to trip the upper left and upper right latch assemblies, spring 326 acts to return lever 298 to its upright or neutral position. Lever 262, however, is held in its unloatching position (displaced counterclockwise from its solid line position of FIG. 11) by control rod 366 which in turn is held in its displaced position by the abutment of upper arm 178 of detent release lever 176 against the upper edge of detent lever 166.

If (with the tailgate closed and the window glass lowered) handle 42 is pivoted clockwise as viewed in FIG. 11, the flange portion 330 of driver lever 328 picks up lever 360 to move it clockwise; clockwise movement of lever 360 pulls control rod 364 to the left. Leftward movement of control rod 364 pivots the lower end of actuator lever 286 upwardly into engagement with the lower edge of the lever arm 268 of detent release lever 262; continued upward movement of lever 286 moves tab portion 266a of the upper arm 266 of lever 262 into engagement with the lower edge of end 232a of detent lever 232, whereby to pivot detent lever 232 out of engagement with tooth 242 on ratchet 230. This allows spring 244 to rotate ratchet 230 and rotary latch 226 in an unlatching direction, whereupon throw-out arm 228 ejects striker 34 and kicks the tailgate away from its closed position. Upward movement of detent release lever 262 also moves control rod 271 upwardly to pivot end 210a of detent lever 210 of latch assembly 36 out of engagement with tooth 216 on ratchet 208. This allows return spring 218 to rotate ratchet 208 and rotary latch 204 in an unlatching direction, whereupon throw-out arm 203 ejects striker 40 and kicks the tailgate away from its closed position. The tailgate is now ajar and is free to be pivoted with pillar 20 outwardly as a door about axis Y—Y. The extent of outward movement about axis Y—Y is limited by check links 70, 72. When handle 42 is released following its clockwise movement to trip the upper right and lower right latching assemblies, spring 326 acts to return lever 298 to its upright or neutral position.

If (with the tailgate closed and the window glass lowered) outer handle 370 is turned clockwise as viewed in FIG. 8, driver member 378 is rotated to move eccentric pin 380 clockwise; pin 380 acts in slot 382 to rotate camming member 384 counterclockwise and move camming end 384a downwardly into engagement with cam 278a on driver lever 276. Continued downward movement of camming end 384a pivots driver lever 276 downwardly; downward movement of lever 276 acts through coil compression spring 380 to pivot detent release lever 262 clockwise (as viewed in FIG. 4) and move tab 266a into engagement with the lower edge of end 232a of detent lever 232 to pivot detent end 232b out of engagement with tooth 242 of ratchet 230. Upward movement of detent release lever 262 also acts through control rod 271 to unlatch lower right latch assembly 36 in the manner previously described. Gate 16 may now be swung with pillar 20 outwardly as a door about axis Y—Y. When handle 370 is released following its turning movement to trip the upper and lower right latch assemblies, spring 390 acts to return the handle to its horizontal or neutral position. Spring 390 also returns driver member 378 and camming member 384 to their neutral positions of FIG. 4.

With the upper right and upper left latch assemblies unlatched, inadvertent unlatching of the lower right latch assembly by either the inside or outside release assemblies is precluded by blocker rod 252. Specifically, as detent release lever 246 is pivoted counterclockwise as viewed in FIG. 7 to trip detent lever 232, rod 252 is slid forwardly (to the right as viewed in FIG. 4) to a position where its free end directly overlies the upper edge of arm 268 of detent release lever 262, whereby to preclude upward movement of lever 262 with consequent unlatching of the lower right latch assembly. If an attempt is made to turn outside handle 370, camming portion 384a will quickly bottom out on flange 278 of driver lever 278 to preclude turning movement of the handle. If the operator persist in trying to turn handle 370, spring 280 will yield to allow relative movement of driver lever 278 and the locked-up detent release lever 262, whereby to prevent warping or other damage to the interior parts of the latch mechanism. Similarly, if an attempt is made to rotate inner handle 42 in a clockwise direction as viewed in FIG. 2, actuator lever 286 quickly bottoms out against the lower edge of lower arm 268 of lock-up detent release lever 262. If the operator persists in trying to turn handle 42 clockwise, spring 336 will yield to allow relative movement of handle lever 298 and the locked-up driver lever 328, whereby to prevent warping or other damage to the interior parts of the latch mechanism.

Blocker rod 252 is precluded from backing out of its forwardly displaced blocking position so long as upper right latch assembly remains in an unlatched condition since hook end 248a of lever 248 moves into a position directly overlying end 323a of detent lever 232 as detent release lever 246 is pivoted to trip detent 232. If blocker rod 252 should tend for any reason to back out of its blocking position, hook end 248a would quickly abut the upper edge of detent 232 to preclude further backing movement.

Rod 252 also functions to preclude inadvertent unlatching of the upper left latch assembly with the upper right and lower right latch assemblies in an unlatched condition. Specifically, as detent release lever 262 is pivoted clockwise as viewed in FIG. 4 (either in response to clockwise movement of inner handle 42 or turning of outer handle 370), lower arm 268 of lever 262 moves into a raised position in which it lies in the path of forward sliding movement of blocker rod 252, whereby to preclude clockwise movement of detent release lever 246 (as viewed in FIG. 7). Blocked lever 246 in turn precludes leftward movement of control rod 368 which in turn precludes rotation of lever 362 in a counterclockwise or unlatching direction. If an attempt is made to turn handle 42 in a counterclockwise direction, cam portion 330 will quickly bottom out against locked up lever 362 to preclude turning movement of the handle. If the operator persists in trying to turn the handle, spring 336 will yield to allow relative movement of handle lever 298 and the locked-up driver lever 328, whereby to prevent warping or other damage to the interior parts of the latch mechanisms. Detent release lever 262 is maintained in its unlatching position (in which lever arm 268 thereof blocks blocker rod 252) by control rod 271 which in turn is held in the raised or unlatched position by the abutment of edge surface 210c of detent release lever 210 of the lower right latch assembly against surface 208a of ratchet 208.

The described mechanism also includes provision to ensure that, when the gate is pivoted about axis X—X to its closed position, the upper left latch assembly will always latch either before, or simultaneously with, the upper right latch assembly. This provision is important since, if the upper right latch were ever allowed to latch without the upper left latch latching, blocking rod 252 would be withdrawn from its blocking position so that the gate could then be actuated as a door (either by the inner or outer handle) to unlatch the upper right and lower right latch assemblies, whereupon all three latch assemblies would be unlatched and the gate supported, precariously, only by hinge pin 22. Specifically, if, upon pivoting the gate to its closed position about axis X—X, ratchet 231 of the upper right latch assembly reaches a latching position clear of detent 232 before the upper left latch assembly has latched, detent 232 is prevented from moving to its latching position by the abutment of upper arm 178 of detent release lever 176 of the upper right latch assembly against the upper edge of the as yet unlatched detent lever 166. Since lever 176 is solidly coupled to detent lever 232 via control rod 366, lever 362, control rod 368, drive lever 260, and detent release lever 246, upper right detent lever 232 cannot fall until upper left detent lever 166 has fallen. However, if ratchet 164 of the upper left latching assembly reaches a latching position clear of detent lever 166 before the upper right assembly has latched, drive lever 260 of the upper right assembly pivots freely relative to detent release lever 246 to allow control rod 368 to move to the right, lever 362 to pivot clockwise, control rod 366 to move to the left, detent release lever 176 to pivot counterclockwise, and detent lever 166 to pivot into latching coaction with ratchet 164. The described mechanism also functions to ensure that, when pivoting the gate about the Y—Y axis to its closed position, the lower right latch assembly will always latch either before, or simultaneously with, the upper right latch assembly. This function is important since if the upper right latch were ever allowed to latch without the lower right latch latching, blocking arm 268 would be withdrawn from its raised, blocking position so that the gate could then be actuated as a gate to unlatch the upper right and upper left latch assemblies, whereupon all three latch assemblies would be unlatched and the gate supported only by hinge pin 22. In the described mechanism, however, the upper right latch cannot latch before the lower right latch because of the rigid control rod 271 interconnecting detent lever 210 and detent release lever 262. That is, when the gate is opened for movement as a door about the Y—Y axis either by rotation of outer handle 370 or by clockwise rotation of inner handle 42, tab 266a is moved upwardly into abutment with the lower edge of end 232a of detent lever 232 and is maintained in that raised position in abutment with detent lever end 232a by control rod 271 which in turn is maintained in its raised position by the aforedescribed abutment of surface 210c of detent 210 with surface 210a of ratchet 210. Since detent lever end 232a must rotate downwardly before the upper right latch assembly can latch, and since lever end 232a is in abutment with tab 266a of the locked-up detent release lever 262, the upper right latch cannot latch until rod 271 is allowed to move downwardly by the counterclockwise (as viewed in FIG. 4) latching movement of detent lever 210. Lower right latch assembly is, however, free to latch before upper right latch assembly since detent release lever 262 is free to pivot downwardly about pin 264 irrespective of the position of detent lever 232.

We claim:
1. A motor vehicle comprising:
   (A) a body structure defining a generally rectangular door opening;
   (B) a door adapted to close at least a portion of said opening;
   (C) an elongated pillar member extending along one side edge of said opening;
   (D) means mounting said pillar member for rotation about an axis generally parallel to said one side edge;
   (E) means connecting said door to said pillar at two points spaced on said pillar along said axis and two points spaced on said door along one side edge of the latter,
      (1) the means connecting one of said points on said pillar to the corresponding point on said door edge comprising means mounting said door for swinging movement on said pillar about an axis generally normal to said pillar axis, and
      (2) the means connecting the other point on said pillar to the other point on said door edge comprising first latch means for releasably latching said door to said pillar when said door is swung on said pillar about said normal axis to a position generally in alignment with said pillar, whereby:
         (a) with said door latched to said pillar said door may be swung with said pillar about said pillar axis between a first position at least partially closing said opening and a second position allowing access to the interior of said body structure through said opening, and
         (b) with said latch means in an unlatched condition, said door may be swung about said normal axis between a first position at least partially closing said opening and a second position allowing access to the interior of said body structure through said opening;
   (F) second latch means operative in response to swinging movement of the door and pillar assembly about said pillar member axis to its closed position to latch said assembly in its closed position; and
   (G) latch release means including:
      (1) a handle movably mounted on said door, and
      (2) means operative in response to movement of said handle in one direction to release only said first latch means and in response to movement of said handle in another direction to release only said second latch means.
2. A motor vehicle comprising:
   (A) a body structure defining a generally rectangular door opening;
   (B) a door adapted to close at least a portion of said opening;
   (C) an elongated pillar member extending along one side edge of said opening;
   (D) means mounting said pillar member for rotation about an axis generally parallel to said one side edge;
   (E) means connecting said door to said pillar at two points spaced on said pillar along said axis and two points spaced on said door along one side edge of the latter,
      (1) the means connecting one of said points on said pillar to the corresponding point on said door edge comprising means mounting said door for swinging movement on said pillar about an axis generally normal to said pillar axis, and
      (2) the means connecting the other point on said pillar to the other point on said door edge comprising first latch means for releasably latching said door to said pillar when said door is swung on said pillar about said normal axis to a position generally in alignment with said pillar, whereby:

(a) with said door latched to said pillar said door may be swung with said pillar about said pillar axis between a first position at least partially closing said opening and a second position allowing access to the interior of said body structure through said opening, and
(b) with said latch means in an unlatched condition, said door may be swung about said normal axis between a first position at least partially closing said opening and a second position allowing access to the interior of said body structure through said opening;

(F) second latch means on the side edge of said door opposite said one side edge thereof and on the side edge of said opening opposite said one side edge thereof, said second latch means
    (1) coacting when said door is swung to a closed position to maintain the door in that position, and
    (2) being operative in its latched condition to define a pivotal connection between said opposite door edge and said opposite opening edge, the axis of said pivotal connection coinciding with said normal axis so that said door is swingably supported for its pivotal movement about said normal axis at its one side edge by said pillar member and at its opposite side edge by said body structure;

(G) third latch means on said opposite side edges, said third latch means being spaced along said opposite door edge, and along said opposite opening edge, from said second latch means and coacting when said door is swung to a closed position about either axis to releasably maintain said door in a closed position; and (H) latch release means including
    (1) a handle member mounted on said door, and
    (2) means operative in response to movement of said handle in one direction to release only said first and third latch means and in response to movement of said handle in another direction to release only said second and third latch means.

3. A motor vehicle according to claim 2 wherein:
(I) said latch release means further includes
    (1) another handle mounted on the outer face of said door and
    (2) means operative in response to actuation of said other handle member to release only said second and third latch means.

4. A motor vehicle comprising:
(A) a body structure defining a generally rectangular door opening;
(B) a door adapted to close at least a portion of said opening;
(C) an elongated pillar member extending along one side edge of said opening;
(D) means mounting said pillar member on said body structure for rotation about an axis generally parallel to said one side edge;
(E) coacting means on said pillar member and one side edge of said door mounting said door on said pillar member for pivotal movement about an axis generally normal to said pillar member axis;
(F) first coacting latch means on said one side edge of said door and on said pillar member spaced from said door pivotal mounting means, said first latch means in its latched condition coupling said door to said pillar member so that said door may be swung with said pillar member about said pillar member axis;
(G) second coacting latch means on the side edge of said door opposite said one side edge thereof and on the side edge of said opening opposite said one side edge thereof:
    (1) said second latch means operating in its latched condition to define a pivotal connection between said opposite door edge and said body structure at said opposite side of said opening, the axis of said pivotal connection coinciding with said normal axis so that said door is swingably supported for its pivotal movement about said normal axis at its one side edge by said pillar member and at its opposite side edge by said body structure,
    (2) said second latch means coacting in response to swinging movement of said door with said pillar member about said pillar member axis to a closed position to latch the door in its closed position;
(H) third coacting latch means on said opposite edges spaced from said second coacting latch means, said third latch means coacting with said first latch means in response to swinging movement of said door about said normal axis to a closed position to latch the door in its closed position;
(I) latch release means operative to selectively
    (1) release said first and third latch means, whereby to allow said door to swing about said normal axis or
    (2) release said second and third latch means, whereby to allow said door to swing with said pillar member about said pillar member axis;
(J) means operative upon swinging movement of said door about said normal axis to a closed position to preclude latching of said third latch means until said first latch means has latched; and
(K) means sensing the condition of said third latch means and operative when said third latch means is in an unlatched condition to block operation of said latch release means in a sense to release said second and third latch means, whereby, if said door is swung about said normal axis to a closed position and said first latch means fails to latch, said third latch means will be maintained in an unlatched condition and said release means will be blocked from thereafter releasing said second latch means.

5. A motor vehicle according to claim 4 wherein:
(L) said first and third latch means each includes a detent movable between latched and unlatched positions;
(M) linkage assemblies interconnect each of said detents to said latch release means; and
(N) said precluding means comprise:
    (1) means positively coupling the linkage assemblies associated with said first and third latch assembly detents so that, upon closing movement of said door about said normal axis, said first latch means detent cannot move to its latched position until said third latch means detent has moved to its latched position.

6. A motor vehicle according to claim 5 wherein:
(O) a lost motion connection is provided in said linkage assemblies associated with said first and third latch assembly detents, said lost motion connection functioning to allow said first latch assembly detent to move to its latched position before movement of said third latch assembly detent to its latched position.

7. A motor vehicle of the station wagon type comprising:
(A) a body structure defining a generally rectangular door opening at the rear of the vehicle extending transversely of the vehicle and substantially the full height of the vehicle, said opening including:
    (1) a relatively narrow upper portion and
    (2) a relatively wide lower portion extending laterally beyond said upper portion at each side of the latter to define a shoulder at each side of the juncture of the upper and lower portions;

(B) an elongated pillar member having a height approximating that of the lower portion of said opening and positioned at one side of said opening portion beneath the related shoulder formed at the juncture of the upper and lower portions;

(C) means mounting said pillar member for pivotal movement on its lengthwise axis about a generally upright axis generally parallel to said one side of said lower opening portion;

(D) a tailgate adapted to close said lower opening portion and having:
  (1) a main body portion having laterally spaced generally upright first and second side walls, said first side wall being adapted to occupy a position laterally spaced from the side wall structure at said one side of the opening lower portion with the tailgate in closed position and said second side wall occupying a position laterally spaced from the side wall structure at the other side of said opening lower portion, and
  (2) a flange portion at each side of said main main body portion extending laterally from the respective side wall of the main body portion at the rear edge of that side wall so as to form lateral extensions of the rear surface of said tailgate, the flange on each side of the tailgate overlying and closing the lateral space at each side of the main body tailgate portion with the tailgate in closed position and the flange extending from said first side wall overlying and concealing the pillar member with the tailgate in closed position;

(E) a generally horizontal hinge pin pivotally interconnecting the lower end of the pillar member to the lower end of the said first side wall so as to mount the tailgate on the pillar member for pivotal movement on the pillar member about the axis of said hinge pin;

(F) coacting latch means on the upper end of said first side wall and on the upper end of said pillar member operative to couple said tailgate to said pillar member so that the tailgate may be swung with the pillar member about the pillar member axis, and (G) latch release means on said tailgate operable to release said latch means and allow said tailgate to be pivoted downwardly about said hinge pin axis.

8. A motor vehicle according to claim 7 wherein said pillar member is stepped inwardly adjacent its lower end to provide a shoulder wall on said pillar member and a slot is provided in said shoulder wall, and wherein said motor vehicle further includes:

(H) a bearing member rotatably mounted on the outboard face of said pillar member above said slot and having a bore passing generally diametrically therethrough; and (I) a torsion bar having:
  (1) a main body portion positioned within the lower end of said tailgate main body portion with its free end anchored to said tailgate adjacent said second side wall and its other end passing through said first side wall, and
  (2) a crank portion extending upwardly from said other end of said main body portion outboard of said first side wall and passing through said slot for slideable receipt in the diametrical bore of said bearing member.

9. A motor vehicle according to claim 7 and further including:

(H) at least one generally upright wedge pin carried on the inboard face of said pillar member; and (I) at least one generally U-shaped socket member carried on said first side wall adjacent the upper end thereof, said socket member opening generally forwardly with the tailgate in closed position and positioned to wedgingly embrace said wedge pin upon closing movement of said tailgate about said horizontal axis.

10. A motor vehicle according to claim 9 wherein:

(J) there are two wedge pins as aforesaid longitudinally spaced on said pillar member with the forward pin extending upwardly beyond the top of the rearward pin;

(K) there are two sockets as aforesaid longitudinally spaced on said first side wall with the forward socket member lying generally above the rearward socket member so that, during closing movement of the gate about said horizontal axis, the forward socket member passes above said rearward pin for wedging engagement with said forward pin while said rearward socket member wedgingly engages said rearward pin.

11. A motor vehicle according to claim 10 wherein:

(L) a spring biased wedge block is provided in each socket member to coact with the related wedge pin to wedge that pin firmly in the socket member.

12. A motor vehicle according to claim 9 wherein:

(J) said latch means includes
  (1) a rotor carried by said first side wall above said socket member, and
  (2) a striker pin projecting inboard from said pillar member above said wedge pin, the latching action of said rotor and striker pin combining with the wedging action of said wedge pin and socket member to rigidly but releasably couple said tailgate to said pillar member to preclude unwanted movement therebetween.

References Cited

UNITED STATES PATENTS

| | | | |
|---|---|---|---|
| 979,654 | 12/1910 | Cork | 49—193 |
| 2,006,004 | 6/1935 | Wenzel | 49—192 |
| 2,374,697 | 5/1945 | Palisano et al. | 49—192 X |

RICHARD J. JOHNSON, *Primary Examiner.*

J. A. PEKAR, *Assistant Examiner.*

U.S. Cl. X.R.

49—192; 296—57